United States Patent [19]

Lederman

[11] Patent Number: 5,201,533
[45] Date of Patent: Apr. 13, 1993

[54] UNITIZED SEAL WITH EXTRA SEALING CONTACT AND METHOD OF MAKING

[75] Inventor: Frederick E. Lederman, Sandusky, Ohio

[73] Assignee: General Motors Corporation, Detroit, Mich.

[21] Appl. No.: 916,452

[22] Filed: Jul. 20, 1992

[51] Int. Cl.$^5$ ............................................. F16J 15/32
[52] U.S. Cl. ....................................... 277/152; 277/35; 384/147; 384/484
[58] Field of Search ................. 277/35, 38, 39, 40, 277/152; 384/482, 484, 485, 486, 140, 147

[56] References Cited

U.S. PATENT DOCUMENTS

| | | | |
|---|---|---|---|
| 2,750,238 | 6/1956 | Black, Jr. | 384/482 |
| 3,101,954 | 8/1963 | Huddle | 277/39 |
| 3,449,029 | 6/1969 | Smith | 384/482 |
| 4,185,838 | 1/1980 | Danner | 277/58 |
| 4,497,495 | 2/1985 | Christiansen | 277/50 |
| 4,516,783 | 5/1985 | Mitsue et al. | 384/485 |
| 4,572,516 | 2/1986 | Symons et al. | 277/50 |
| 4,655,618 | 4/1987 | Labedan et al. | 384/486 |
| 4,958,942 | 9/1990 | Shimizu | 384/486 |
| 5,024,364 | 6/1991 | Nash | 277/35 |

FOREIGN PATENT DOCUMENTS 2130310 5/1984 United Kingdom ................ 384/486

Primary Examiner—William A. Cuchlinski, Jr.
Assistant Examiner—Daniel G. DePumpo
Attorney, Agent, or Firm—Patrick M. Griffin

[57] ABSTRACT

A unitized seal uses two casings and two attached disks of sealing material to provide four total lines of sealing contact. The casings have interleaved, axially and radially overlapping walls, the inner two of which carry the sealing disks. Radial overlap between the sealing disks, which flex easily past one another as the casings are assembled together, prevents casing pull apart during shipping and handling.

2 Claims, 4 Drawing Sheets

UNITIZED SEAL WITH EXTRA SEALING CONTACT AND METHOD OF MAKING

This invention relates to unitized seals in general, and specifically to such a seal that provides additional levels of assured sealing contact and a method of making same.

BACKGROUND OF THE INVENTION

So called unitized seals can be installed in the annular space between a pair of relatively rotatable members, such as bearing races. A pair of nested, coaxial metal casings, one press fit onto each bearing race, enclose internal rubbing seals. Many examples of unitized seals can be found in the issued U.S. patents. Some designs have only one seal, which is attached to one casing and rides on the other, as in commonly assigned U.S. Pat. No. 4,572,516 to Symons et al. Others have more than one seal, all attached to one casing and riding on the other casing, as in commonly assigned U.S. Pat. No. 4,497,495 to Christiansen or U.S. Pat. No. 4,958,942 to Shimizu. Yet others have one seal on each casing, each of which rides on the other casing, as in U.S. Pat. No. 4,185,838 to Danner. The aforementioned patents all show designs in which the seals are integrally molded to one or more of the stamped casings, a process that can be somewhat difficult to control due to complexity in the seal shapes or variations in the metal stampings. Another shortcoming of the various designs is that there is typically no provision for retaining the casings together against axial separation, prior to installation, apart from separately rolling or crimping over an edge of one of the metal casings to overlap the other. This requires an additional manufacturing step subsequent to nesting the casings together.

A newer type of unitized seal eliminates the seal molding step by using sealing disks cut from flat sheets of polytetrafluoroethylene (PTFE) material and separately bonding or otherwise attaching them to one casing in an orientation where they make sealing contact with the other casing. Much lower seal torque or friction is possible with PFTE disks, because of the slippery nature of the material. Generally, such seal designs have the same general configuration as equivalent molded designs, so the same problem of preinstallation casing separation is faced. An example may be seen in U.S. Pat. No. 5,024,364 to Nash et al. All the embodiments incorporate two disks of PFTE, one fixed to each casing, each of which makes one sealing contact line with the opposite casing. In the FIG. 4 embodiment, there is no structure to directly block axial separation of the two casings. In the FIG. 3 embodiment, edges of the casings are crimped over at (56) and (58), so as to resist axial separation of the casings by blocking the edges of the disks. However, as shown, the casing crimped edges (56) and (58) are preformed, which means that, as the casings are pushed together, the edges of the disks are dragged across the casing edge and flexed away to a great extent. Should the disk flex to such a degree that it takes on a permanent set and does not make good sealing contact, there is no easy way to correct the problem.

A problem faced by both types of seals, integrally molded and PFTE, is the inevitable running eccentricity that bearing races are subject to, which continually widens and narrows the annular space between them. This means that the seal disks have to be given enough interference with the casing surfaces on which they ride to assure that sealing contact is maintained when the annular space widens. One approach, as shown in FIG. 4 of the Nash patent, is to cut a disk so large that it has a very large area of contact with the casing surface on which it rides. Sealing contact is assured, but the extra seal interference does increase seal friction, in spite of the slippery nature of the the seal material. Providing less interference between the edge of the disk and the casing surface on which it rides, as shown in FIG. 6 of the same patent, produces much less running friction. However, a narrow wedge shape is thereby created between the edge of the disk and the casing surface that it rides on, and the constant widening and narrowing of the annular space between the bearing races has the same effect on the wedge. This can create a pumping action that acts to continually drive material away from the disk edge. The edge of the disk can either be bent in a closed orientation, with the wedge facing away from the space that it is sealing, or in an open orientation, with the wedge facing toward the space that it is sealing. The closed orientation is preferred, because it is harder for materials to get under the edge of such a disk. But once material does get under, its migration is assisted by the pumping action. Another problem is disk edge damage that can potentially occur during shipping and handling if the casings are displaced radially far enough to pinch the disks.

SUMMARY OF THE INVENTION

The invention provides a unitized seal of the type described above that deals with preinstallation casing separation, disk edge pumping, and shipping damage, all in a design that provides extra, assured sealing contact and a simplified method of assembly.

In the preferred embodiment disclosed, an outer and an inner channel shaped casing each has an installation wall that is press fit onto a respective bearing race, and a radially spaced cylindrical seal mounting wall that nests between the installation wall and seal mounting wall of the other casing. A disk of sealing material is secured centrally to the edge of each seal mounting wall. Each disk is wider than the radial space between the two walls of the other casing, with enough width differential to exceed the expected degree of running eccentricity. Therefore, when the two casings are nested together, one edge of each disk makes sealing contact with the installation wall of the opposite casing. Simultaneously, the other edges of the disks, which radially overlap one another, flex past one another without damage before snapping back into sealing contact with the seal mounting walls of the opposite casings. Four total lines of sealing contact are thereby created. The two disk edges that face the ambient and the bearing lubricant supply each have a closed orientation, while the two inner disk edges have an open orientation. In addition, three enclosed volumes are created by the interengagement of the two casings and two disks, an outer volume, inner volume, and an intermediate central volume.

After assembly, but before installation, axial separation of the casings is prevented by the radial overlap of the inner disk edges. There is no need to crimp over any part of the casings to prevent casing separation. In addition, radial displacement of the casings that could damage the disks is diminished, since two disk edges will always be compressed and resist. In operation, sealing contact is assured despite the running eccentricity that widens and narrows the annular space. At any point along the circumference of the seal, two of the four lines of sealing contact will increase their pressure as two decrease. Any material that does pass under the disk edges, whether outside contaminants or lubricant, first enters the outer or inner enclosed volume. Once there, it faces one of the inner disk edges, which, having an open orientation, tends to pump it back. Any material getting past an intermediate disk edge enters the center enclosed volume, where it faces yet another intermediate disk edge, but with a closed orientation. The barriers to contaminant entry or lubricant exit are many, all located within the same size annular space.

DESCRIPTION OF THE PREFERRED EMBODIMENT

These and other objects and features of the invention will appear from the following written description, and from the drawings, in which.

Figure 11:
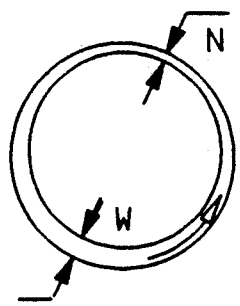
Figure 12:
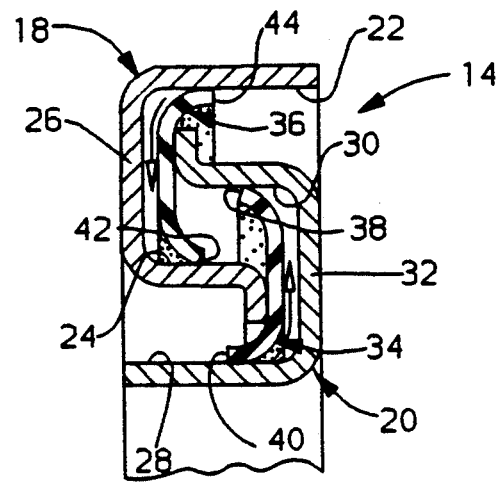
Figure 13:
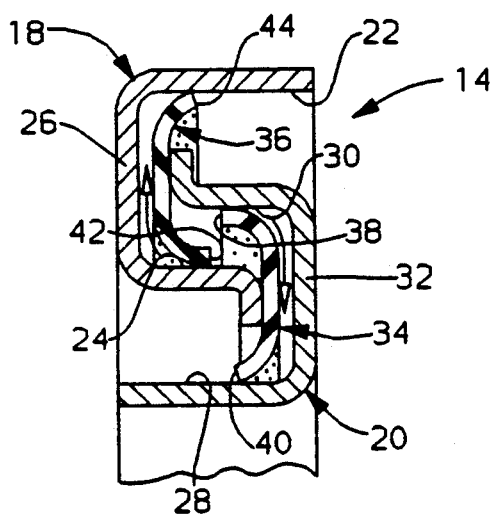
Figure 14:
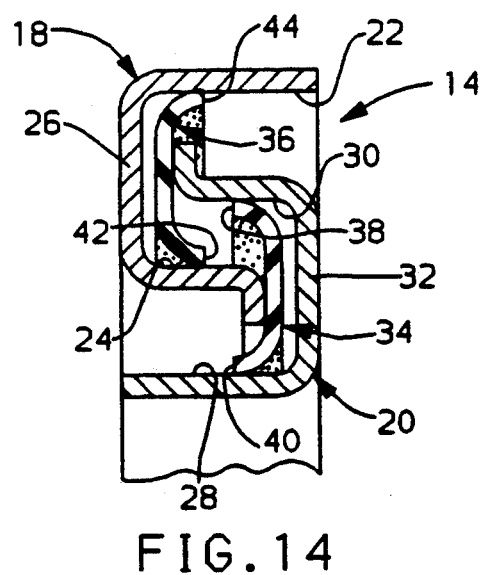
Figure 15:
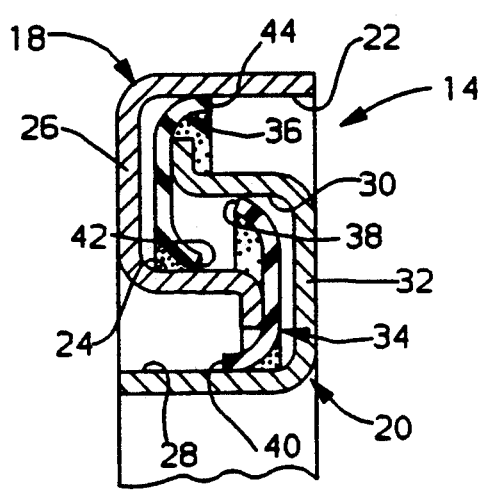

FIG. 11 diagramatically illustrates the running eccentricity of the bearing races that narrows and widens the annular space between them;

FIG. 12 shows the dynamic response of the seal to a narrowing of the annular space;

FIG. 13 shows the dynamic response of the seal to a widening of the annular space;

FIG. 14 shows the nominal shipping position of the seal casings;

FIG. 15 shows the response of the seal to a radial misalignment of the seal casings during shipping.

Figure 1:
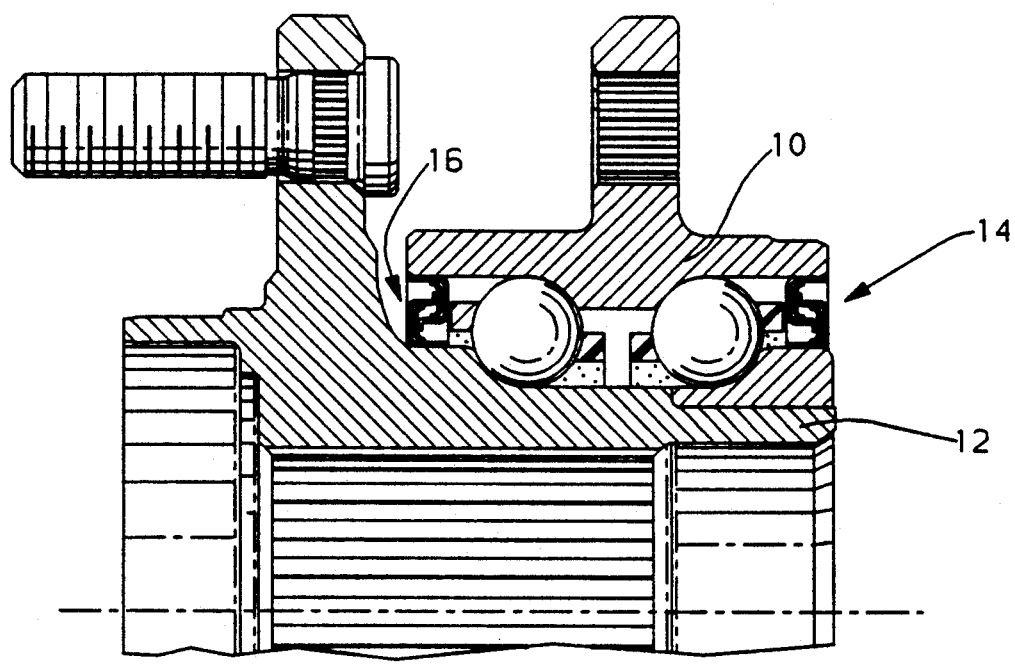
FIG. 1 is a cross section through a vehicle wheel bearing incorporating the seal of the invention.
Figure 2:
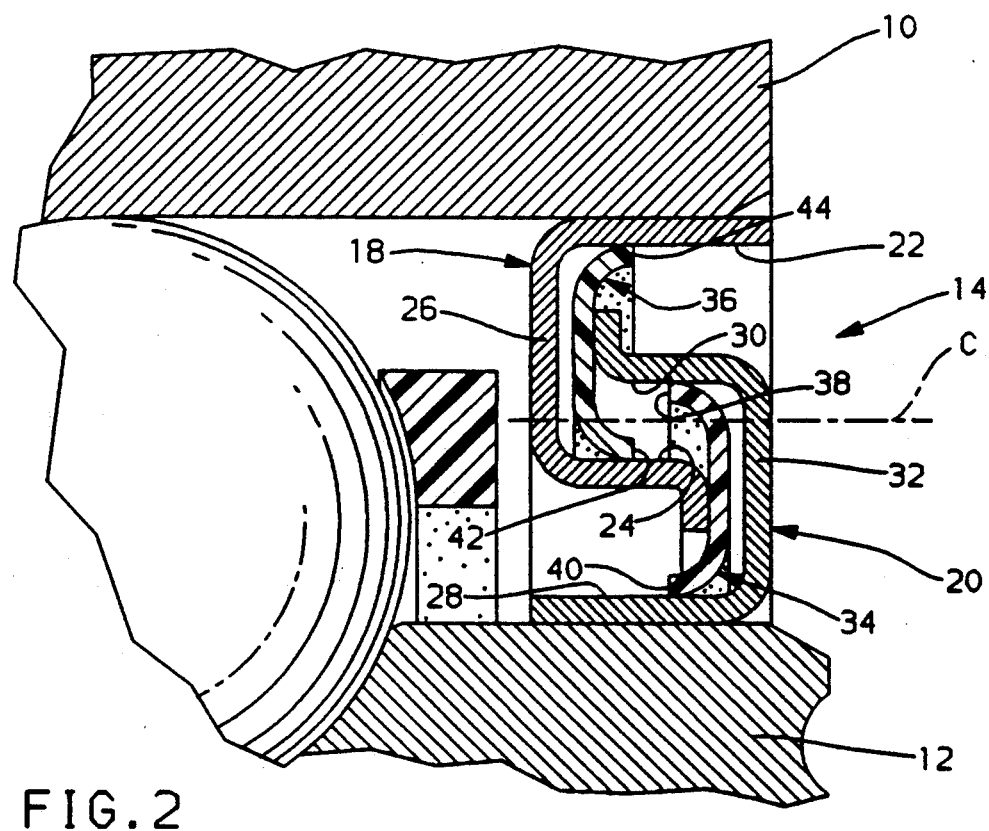
FIG. 2 is an enlargement of the cross sectioned seal.

Referring first to FIGS. 1, 2 and 11, a vehicle wheel bearing includes two relatively rotatable members, an outer race or hub (10), which surrounds a coaxial inner race or spindle (12) to form an annular space therebetween. The central dividing line of the annular space, which is an imaginary cylinder in fact, is indicated at the dotted line C. Two of the unitized seals of the invention, indicated generally at (14) and (16), are installed at each end of the annular space between the races (10) and (12). The seals (14) and (16) are identical mirror images of one another, so only the seal (14) is described in detail. As with any other bearing seal, seal (14) is intended to exclude dust, water and other contaminants from the ambient (on the right, in FIG. 1) and to retain lubricant (on the left). A characteristic of bearings that makes the sealing task more difficult is the fact that the races (10) and (12) do not run perfectly coaxial to one another. They run eccentrically, to a small degree, which causes the radial width of the annular space between the races (10) and (12) to widen and narrow rapidly, at any point around the circumference of seal (14). This is indicated in exaggerated fashion in FIG. 11, with the widest point indicated at W and the narrowest at N. The difference between W and N may be referred to as the predetermined degree of eccentricity. While not large in absolute terms, the degree of eccentricity, coupled with very high rotational speeds, can have a noticeable dynamic effect, described in more detail below.

Figure 3:
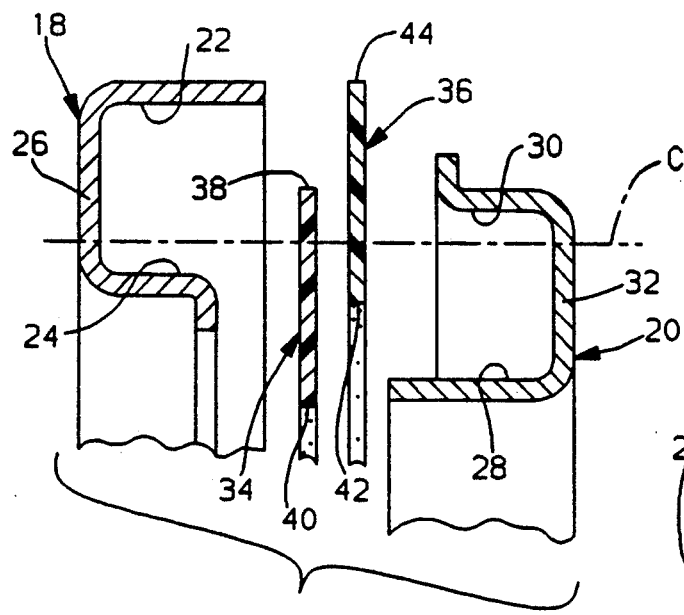
FIG. 3 shows the various components of the seal prior to assembly.

Referring next to FIGS. 2 and 3, two of the four components of seal (14) are described in detail. Two stamped steel casings, an outer casing indicated generally at (18) and an inner casing indicated generally at (20), are each channel shaped, or C shaped in cross section. Outer casing (18) includes a cylindrical installation wall (22), a radially spaced cylindrical seal mounting wall (24) extending axially outwardly, and an annular web (26) that interconnects them. Inner casing (20) includes a cylindrical installation wall (28), a radially spaced cylindrical seal mounting wall (30) extending axially inwardly, and an interconnecting annular web (32). The width of the two webs (26) and (32) is essentially the same as the radial separation between the corresponding installation walls and seal mounting walls that they join. The two installation walls (22) and (28) press fit snugly to the inner surfaces of hub (10) and spindle (12) respectively. Each seal mounting wall (24) and (30) is turned out slightly at its edge, and is located at a diameter that puts it intermediate the central dividing line C and the opposite race (10) or (12). As a consequence, the two casings (18) and (20) may be pushed coaxially together until flush with one another, but no parts thereof will contact, either radially or axially. When nested together, the axially overlapping seal mounting walls (24) and (30) form an internal radial space between them, which is used as described below.

Figure 4:
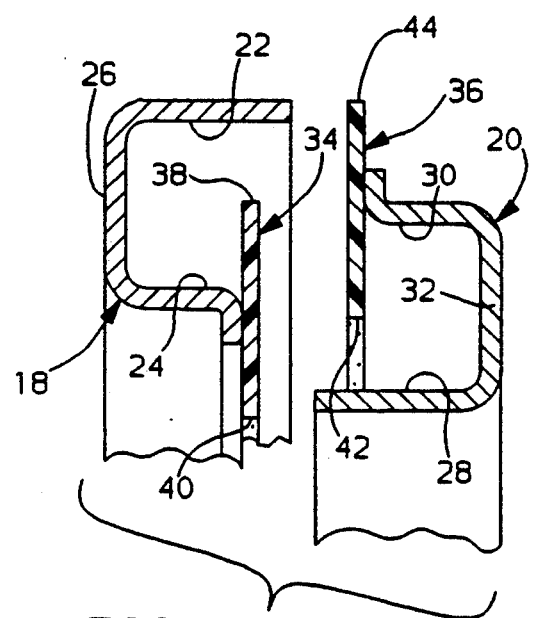
FIG. 4 shows the sealing disks secured to the casings, before the casings are pushed together.

Referring next to FIGS. 3 and 4, the other two components of seal (14) are two annular disks, a first disk indicated generally at (34), and a second indicated generally at (36), which are cut from a flat sheet of PFTE material. The PFTE material is low friction, and also flexible and resilient. Disk (34), the smaller of the two, has a midpoint diameter, that is, the diameter of an imaginary circle halfway between its inner edge (38) and outer edge (40), substantially equal seal mounting wall (24). Larger disk (36) has a midpoint diameter between its inner edge (42) and outer edge (44) that is substantially equal to the other seal mounting wall (30). Consequently, each disk (34) and (36) can be joined to the edge of a respective seal mounting wall (24) or (30) centrally, that is, at its midpoint diameter, as shown in FIG. 4. The disks (34) and (36) may be secured by any suitable means, such as adhesive or sonic welding. Each disk (34) and (36) is also wider, edge-to-edge, than a respective web (32) and (26). That radial width differential is greater than the degree of eccentricity defined above, which serves a purpose described next.

Figure 5:
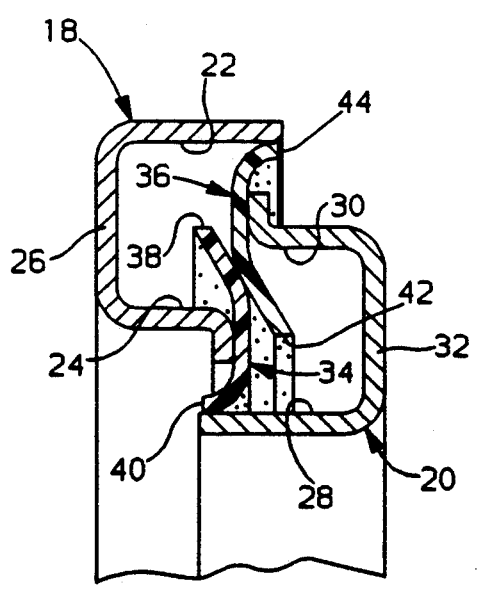
FIG. 5 shows the casings initially being pushed together.
Figure 6:
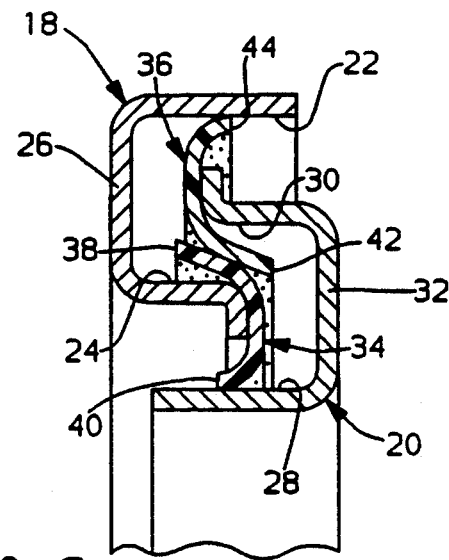
FIG. 6 shows the casings pushed farther together.
Figure 7:
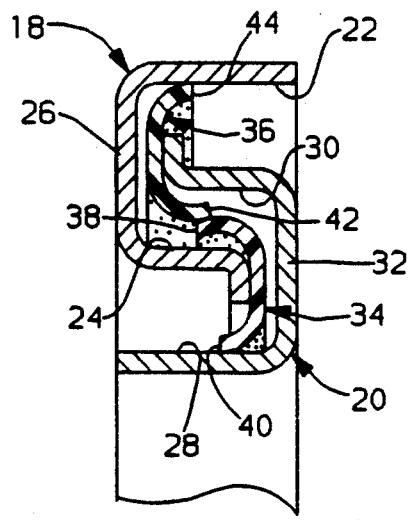
FIG. 7 shows the casings pushed almost all the way together.
Figure 8:
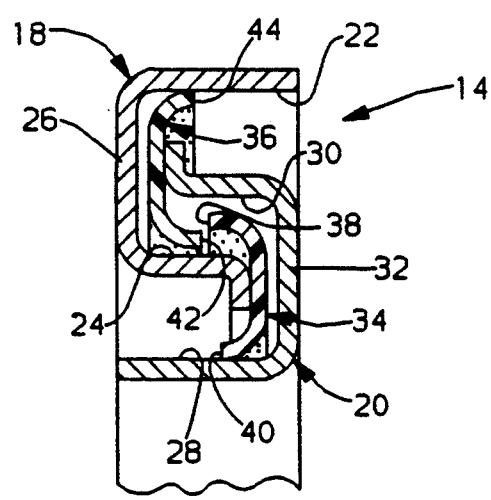
FIG. 8 shows the casings pushed completely together, with the disks in a slightly deformed condition.
Figure 9:
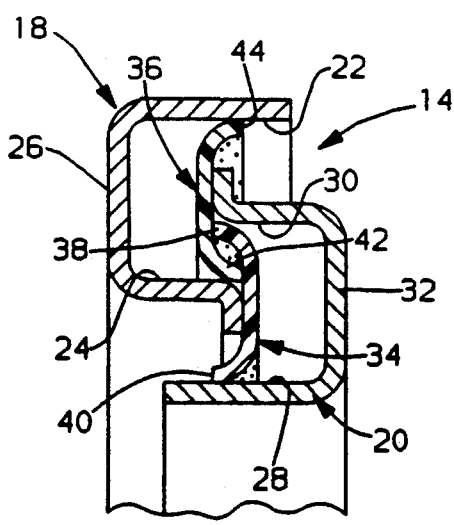
FIG. 9 shows the casings being pulled back slightly to return the disks to their undeformed condition.

Referring next to FIGS. 5 through 9, the assembly of seal (14) is illustrated. Because of the diameter, location, and width of the disks (34) and (36), they have a significant mutual radial overlap of their respective inner edges (38) and (42) when the casings (18) and (20) are coaxially disposed. When the casings (18) and (20) are pushed together, they do not contact directly, as noted above, but the inner disk edges (38) and (42) do. As shown in FIGS. 5 through 7, the inner edges (38) and (42) wipe past one another, flexing the disks (34) and (36), until, as shown in FIG. 8, they snap past one another. The disks (34) and (36) will not damage one another, as they might if they were dragged over a metal casing edge with the same degree of flexing. At the same time, the disk outer edges (40) and (44) slide along the inner surfaces of respective casing installation walls (28) and (22). As shown in FIG. 8, the disk inner edges (38) and (42) could take on a set that would affect their sealing contact with the inner surfaces of the opposed casing seal mounting walls (30) and (24), because of the degree to which they flex during assembly. However, as shown in FIG. 9, that can be easily compensated in the invention by pulling the casings (18) and (20) partially axially apart again, so that the backsides of the disks (34) and (36) contact and pull each other back into tight sealing contact.

Figure 10:
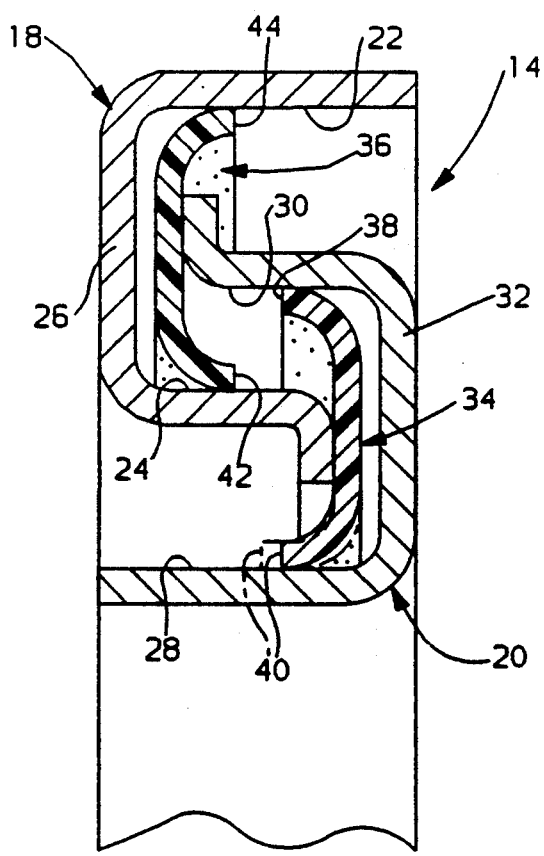
FIG. 10 shows the response of one disk edge to a radial misalignment.

Referring next to FIG. 10, in the completed seal (14), the seal mounting walls (24) and (30) are radially offset from one another, and axially overlap, while the sealing disks (34) and (36) are axially offset from one another, and radially overlap. This creates a very compact package that makes optimum use of the available axial and radial space between the races (10) and (12). Seal (14) has four total lines of sealing contact (thin annular contact areas, in fact), because of the width of the disks (34) and (36), and because each is centrally secured to a respective seal mounting wall (24) and (30). As indicated by the solid lines of FIG. 10, each disk edge (38) through (42) is equally bent, at least when the casings (18) and (20) are coaxial. The extra seal torque or friction resulting from the extra sealing contact is not great, because of the low friction properties of the disk (34) and (36). Since the two inner disk edges (38) and (42) occupy the same radial space between the axially overlapping seal mounting walls (24) and (30), no greater annular space between the races (10) and (12) is needed to accommodate the two extra lines of sealing contact. Both the disk edge (44) that faces ambient, and the disk edge (40) that faces the lubricant supply, are closed in orientation. This orientation strongly resists intrusion of either outside contaminants in or lubricant out, the first effect of which is to close the edges more strongly. In addition, three enclosed spaces or volumes are created by the two disks (34) and (36), an outer volume between disk (36) and web (26), an inner volume between disk (34) and web (32), and a central, intermediate volume between the disk inner edges (38) and (42), which aid in sealing, as described farther below. As indicated by the solid lines of FIG. 10, each disk edge (38) through (42) is equally bent, at least when the casings (18) and (20) are coaxial.

Referring next to FIGS. 9, 14 and 15, the static performance of seal (14), that is, its performance during shipping and handling, is illustrated. FIG. 9 also shows that the radial overlap of the disks (34) and (36) would block the casings (18) and (20) from pulling axially apart during handling. The disk inner edges (38) and (42) hook one another, so the disks (34) and (36) are more resistant to being bent back than they were to flexing past one another during assembly initially. No extra assembly step, such as crimping over a casing edge, is necessary. In addition, shipping damage protection for the disks (34) and (36) is provided. FIG. 14 shows the nominal shipping position of seal (14), with the casings (18) and (20) coaxial. FIG. 15 shows the casings (18) and (20) pulled radially apart, which would have the opposite effect on the diametrically opposed side of seal (14). At the point shown, two of the four disk edges, the outer disk edges (44) and (40), are compressed farther from their FIG. 14 position, and their resilience resists further compression. This provides more protection against radial displacement of the casings (18) and (20) than would be the case if only one edge each of the two disks (34) and (36) made sealing contact, in which case only one edge would be compressed.

Referring next to FIG. 10 and to FIGS. 11 through 13, the dynamic, operational features of seal 14 are illustrated. With radial displacement of the casings (18) and (20) caused by the running eccentricity described above, all four disk edges (38-44) remain in sealing contact, because their width differentials relative to the webs (26) and (32) are greater than the degree of eccentricity. As seen by comparing FIGS. (12) and (13), narrowing or widening of the annular space at any point around the circumference of seal (14) causes two of the four edges (38-44) to deflect more, increasing their sealing pressure, even though the other two deflect less. While sealing contact is maintained, the same flexing and unflexing of the edges (38-44) causes two of the wedge shaped areas between the disk edges (38-44) and the casing surfaces on which they ride to narrow, as the other two widen. The wedge narrowing is illustrated for one edge (40) only in FIG. 10 by dotted lines. The result for all edges is illustrated in FIGS. 12 and 13. This occurs approximately once per revolution, and the net effect of the rapid widening and narrowing of the wedge is a slight pumping action away from the disk edge. As shown in FIG. 12, any material which does get under the disk edge (44) is first trapped in the space between disk (36) and web (26). While it is pumped slightly toward the other disk edge (42) as the annular space narrows, FIG. 12, that same effect pumps it back half a revolution later, as shown in FIG. 13. Should any outside contaminants make it past the inner disk edge (42), they are then trapped in the space between it and the other inner disk edge (38), which has a relative closed orientation. It is, therefore, difficult for contaminants to escape past inner edge (38), where they would be trapped in the space between web (32) and disk (34). The same applies in reverse to migration of lubricant past disk edge (40).

In conclusion, a high degree of cooperation is created between and among only four components. Each disk (34) and (36) provides two lines of sealing contact, and the same radial overlap of the two disk inner edges (38) and (42) that provides the compact packaging also retains the casings (18) and (20) together during shipping. The disks (34) and (36) and casings (18) and (20) together provide multiple seal contact and trapping barriers to retard contaminant entrance or lubricant exit. Variations in the disclosed embodiment could be made. For example, the cylindrical walls (24) and (30) could simply provide extra sealing walls for the disk inner edges (42) and (38), without the disks (34) and (36) being physically secured thereto. There would still be four lines of assured sealing contact in a compact package. However, it is a great advantage to build the seal in the fashion disclosed, as the securement of the disks (34) and (36) to the walls (24) and (30) holds them in the proper orientation during assembly, as well as blocking casing pull apart during shipping. Therefore, it will be understood that it is not intended to limit the invention to just the embodiment disclosed.

The embodiments of the invention in which an exclusive property or privilege is claimed are defined as follows:

1. A unitized seal for installation in an annular space between outer and inner, relatively rotatable members, said annular space having a central dividing line, said members also being subject to a running eccentricity of predetermined degree that varies the radial width of said annular space, said seal comprising,

- an outer, generally channel-shaped casing having a cylindrical installation wall adapted to be secured to said outer member and a radially spaced cylindrical seal wall extending in one axial direction and located at a diameter intermediate said inner member and said central dividing line,
- an inner, generally channel-shaped casing coaxial to said outer casing and having an installation wall adapted to be secured to said inner member and a radially spaced cylindrical seal wall extending in the opposite axial direction and located at a diameter intermediate said outer member and said central dividing line, whereby said respective seal walls axially overlap with one another with a radial space therebetween,
- a first generally annular disk of sealing material having a width that exceeds the radial space between the walls of said inner casing by at least said degree of eccentricity so as to create two lines of sealing contact within said inner casing, and,
- a second generally annular disk of sealing material having a width that exceeds the radial space between the walls of said outer casing by at least said degree of eccentricity so as to create two lines of sealing contact within said outer casing,
- whereby said first and second disks together make four lines of assured sealing contact with said casing walls, two of which are located within the radial space between said seal mounting walls, with two of said lines of sealing contact increasing in pressure due to said running eccentricity at any point around the circumference of said seal.

2. A unitized seal for installation in an annular space between outer and inner, relatively rotatable members, said annular space having a central dividing line, said members also being subject to a running eccentricity of predetermined degree that varies the radial width of said annular space, said seal comprising,

- an outer, generally channel-shaped casing having a cylindrical installation wall adapted to be secured to said outer member and a radially spaced cylindrical seal mounting wall extending in one axial direction and located at a diameter intermediate said inner member and said central dividing line,
- an inner, generally channel-shaped casing coaxial to said outer casing and having an installation wall adapted to be secured to said inner member and a radially spaced cylindrical seal mounting wall extending in the opposite axial direction and located at a diameter intermediate said outer member and said central dividing line, whereby said casings may be moved coaxially together until said respective seal mounting walls axially overlap with a radial space therebetween,
- a first generally annular disk of flexible, resilient sealing material having a midpoint diameter substantially equal to the diameter of said outer casing seal mounting wall and having a width that exceeds the radial space between the seal mounting walls of said inner casing by at least said degree of eccentricity, and,
- a second generally annular disk of flexible, resilient sealing material having a midpoint diameter substantially equal to the diameter of said inner casing seal mounting wall and having a width that exceeds the radial space between the seal mounting walls of said outer casing by at least said degree of eccentricity, so that said second and first disks, when maintained coaxial, have a radial overlap,
- whereby said first and second disks may be first joined at their midpoint diameters to said respective seal mounting walls, thereby maintaining said disks coaxial, after which said outer and inner casings may be moved coaxially together as said first and second disks flex past one another, after which said radially overlapping disks block axial separation of said casings and also make four lines of assured sealing contact, two of which are located within the radial space between said seal mounting walls, with two of said lines of sealing contact increasing in pressure due to said running eccentricity at any point around the circumference of said seal.

* * * * *